United States Patent
Greenlee et al.

(10) Patent No.: US 11,620,260 B2
(45) Date of Patent: *Apr. 4, 2023

(54) RECORD PROPERTY SYNCHRONIZATION IN A NETWORK COMPUTING SYSTEM

(71) Applicant: International Business Machines Corporation, Armonk, NY (US)

(72) Inventors: Kenneth L. Greenlee, Raleigh, NC (US); Thomas T. Hanis, Raleigh, NC (US); Sunil K. Mishra, Morrisville, NC (US); Donnie A. Smith, Jr., Raleigh, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 356 days.

This patent is subject to a terminal disclaimer.

(21) Appl. No.: 16/713,723

(22) Filed: Dec. 13, 2019

(65) Prior Publication Data
US 2020/0117681 A1    Apr. 16, 2020

Related U.S. Application Data

(63) Continuation of application No. 14/943,142, filed on Nov. 17, 2015, now Pat. No. 10,579,644.

(51) Int. Cl.
*G06F 16/00* (2019.01)
*G06F 16/14* (2019.01)
*G06F 16/27* (2019.01)

(52) U.S. Cl.
CPC .......... *G06F 16/152* (2019.01); *G06F 16/273* (2019.01)

(58) Field of Classification Search
CPC .............................. G06F 16/152; G06F 16/273
See application file for complete search history.

(56) References Cited

U.S. PATENT DOCUMENTS 5,379,391 A * 1/1995 Belsan ................ G06F 12/0815
711/114
6,857,045 B2 * 2/2005 Galbraith ............ G06F 12/0866
707/999.1

(Continued)

OTHER PUBLICATIONS

Westphal, C., "Synchronizing State With Strong Similarity Between Local and Remote Systems," Proceedings of the 3rd ACM Workshop on Mobile Cloud Computing and Services, 'MCS 12, Jun. 25, 2012, pp. 15-20.

(Continued)

*Primary Examiner* — Paul Kim
(74) *Attorney, Agent, or Firm* — Cuenot, Forsythe & Kim, LLC

(57) ABSTRACT

Data synchronization includes receiving an update request from a client system for a first record set, wherein the update request includes search criteria used to initially determine the first record set and hash summaries of records of the first record set, and searching a data storage device for records matching the search criteria. The searching generates a second record set of records having hash summaries. Record identifiers of records of the second record set may be compared with record identifiers of the hash summaries of the first record set. Responsive to determining that a record identifier of a selected hash summary of the first record set matches a record identifier of a record of the second record set, a determination may be made whether hash fields of the selected hash summaries mismatch and, responsive to determining a mismatch between hash fields, a field of the record of the second record set represented by the mismatched hash fields may be sent to the client system without sending fields of record determined to match.

20 Claims, 5 Drawing Sheets

(56) References Cited

U.S. PATENT DOCUMENTS

| | | | | |
|---|---|---|---|---|
| 7,315,884 B2* | 1/2008 | Mogul | ................ | H04L 67/2852 |
| | | | | 709/217 |
| 7,421,542 B2* | 9/2008 | Graham | .............. | G06F 11/1658 |
| | | | | 711/141 |
| 7,685,377 B1* | 3/2010 | Milligan | ............... | G06F 3/0608 |
| | | | | 711/154 |
| 8,364,903 B2* | 1/2013 | Singh | ....................... | G06F 9/526 |
| | | | | 711/141 |
| 8,788,458 B2* | 7/2014 | Waterman | ............... | G06F 16/27 |
| | | | | 707/610 |
| 8,930,494 B2* | 1/2015 | Knowles | ................. | H04L 63/12 |
| | | | | 709/217 |
| 10,579,644 B2 | 3/2020 | Greenlee et al. | | |
| 2005/0262167 A1* | 11/2005 | Teodosiu | ................. | G06F 16/20 |
| 2008/0098041 A1* | 4/2008 | Chidambaran | ... | G06F 16/24552 |
| 2008/0098173 A1* | 4/2008 | Chidambaran | ... | G06F 16/24552 |
| | | | | 711/118 |
| 2013/0226888 A1* | 8/2013 | Govind | ................. | G06F 16/172 |
| | | | | 707/698 |
| 2017/0140020 A1 | 5/2017 | Greenlee et al. | | |

OTHER PUBLICATIONS

IBM: List of IBM Patents or Patent Applications Treated as Related, Jun. 11, 2021, 2 pg.

Greenlee, K.L. et al., "Record Property Synchronization in a Network Computing System", U.S. Appl. No. 14/943,142, filed Nov. 17, 2015, 30 pages.

* cited by examiner

RECORD PROPERTY SYNCHRONIZATION IN A NETWORK COMPUTING SYSTEM

BACKGROUND

This disclosure relates to record property synchronization in a network computing system. Many modern computing systems are network-based and use a client-server model where a plurality of client systems are in communication with a server system. In order for the network computing system to operate properly, data must be synchronized between the client systems and the server system. Initially, the client systems may obtain a collection of records from the server system. Once obtained, the collection of records may then be utilized locally within the client systems. Over time, the records within the server may change and diverge from what was originally provided to the client systems. As such, to maintain data consistency within the network computing system, the client systems must synchronize data with the server system.

SUMMARY

An embodiment of the present invention may include a method of data synchronization. The method may include receiving, using a processor, an update request from a client system for a first record set to be updated. The update request may include search criteria used to initially determine the first record set and hash summaries of records of the first record set. The method may include searching, using the processor, a data storage device for records matching the search criteria, wherein the searching generates a second record set of records having hash summaries. The method also may include comparing, using the processor, record identifiers of records of the second record set with record identifiers of the hash summaries of the first record set. The method further may include, responsive to determining that a record identifier of a selected hash summary of the first record set matches a record identifier of a record of the second record set, determining, using the processor, whether hash fields of the selected hash summary of the first record set match hash fields of the hash summary of the record of the second record set. The method may also include, responsive to determining a mismatch between hash fields, sending, using the processor, a field of the record of the second record set indicated by the mismatched hash fields to the client system without sending fields of the record determined to match.

Another embodiment of the present invention may include a system for data synchronization having a processor programmed to initiate executable operations as described within this disclosure.

Another embodiment of the present invention may include a computer program including a computer readable storage medium having program code stored thereon for data synchronization. The program code is executable by a processor to perform one or more methods as described within this disclosure.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

This disclosure relates to record field synchronization in a network computing system. In accordance with the inventive arrangements disclosed herein, records between a client system and a server system may be synchronized with a greater degree of granularity thereby reducing the amount of data exchange required for the synchronization operations. In one aspect, data may be synchronized at the field level within a record. As such, rather than sending entire records between a client system and a server system, in some cases, only those fields of the record that have changed need be sent, while fields of records that have not changed are not sent to the client for data synchronization.

Figure 1:
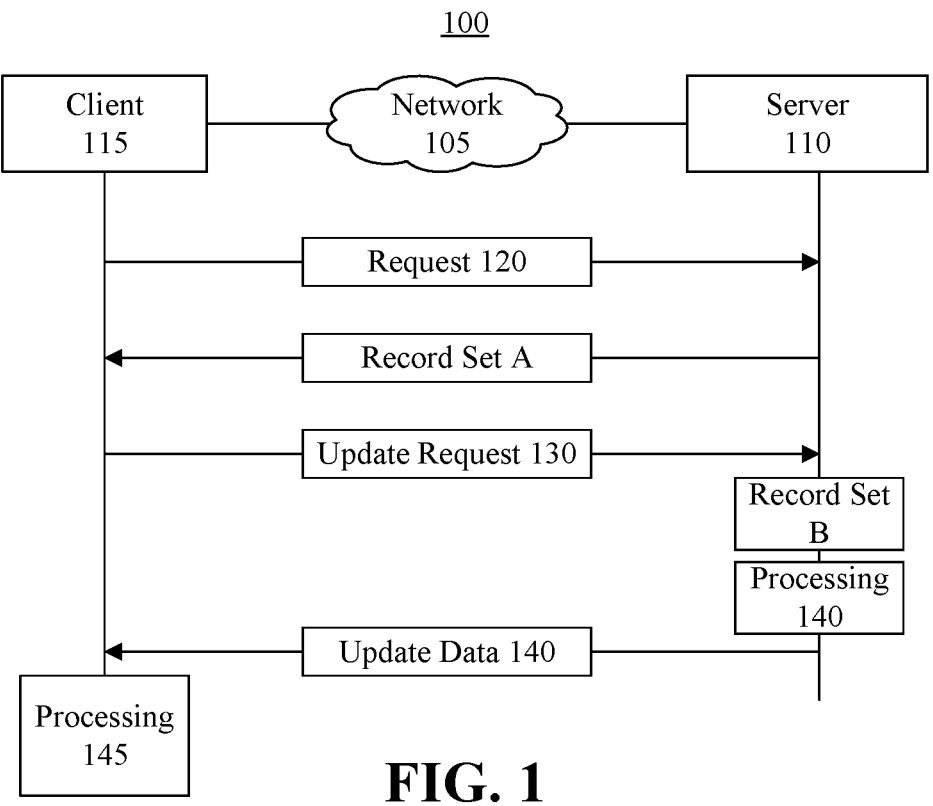
FIG. 1 is a block diagram illustrating an example of a network computing system.

FIG. 1 is a block diagram illustrating an example of a network computing system 100 in which the inventive arrangements may be implemented. Network computing system 100 contains a network 105. Network 105 is the medium used to provide communications links between various devices and data processing systems connected together within network computing system 100. Network 105 may include connections, such as wire, wireless communication links, or fiber optic cables. Network 105 may be implemented as, or include, any of a variety of different communication technologies such as a Wide Area Network (WAN), a Local Area Network (LAN), a wireless network, a mobile or cellular network, a Virtual Private Network (VPN), the Internet, the Public Switched Telephone Network (PSTN), or the like.

In the depicted example, a server 110 and a client 115 may couple to network 105. Server 110 may be implemented as one or more data processing systems executing suitable operational software to support client-server interactions through network 105. Client 115 may be implemented as a data processing system executing suitable operational software to communicate with server 110. For example, client 115 may be a personal computer, a portable computing device such as a tablet computer or laptop, a mobile phone, or the like. In one arrangement, client 115 may execute a browser that may access server 110 and data stored on server 110.

As pictured, client 115 may send request 120 to server 110. Request 120 may specify a search criteria. Server 110 may perform a search using the search criteria received in request 120 to determine or generate a record set A. Server 110 may send a record set A to client 115 in response to request 120. Record set A may include records found from searching a data storage device including records using the search criteria of request 120. In one arrangement, record set A may include one or more records and a hash summary for each record within record set A.

Subsequently, client 115 may send an update request 130 to server 110. Client 115 may request updates from time-to-time, responsive to particular events, or periodically. For example, client 115 may request an update each minute, every two minutes, every five minutes, responsive to a user input requesting updated data, or the like. Accordingly, update request 130 may request updated versions of the records previously received as record set A. In one arrangement, update request 130 may include the search criteria originally provided in request 120 and the hash summary of each record received in record set A.

Responsive to update request 130, server 110 may perform another search using the search criteria from update request 130 to determine another record set B. Server 110 may perform processing 140 by, at least in part, by comparing record identifiers of hash summaries received in update request 130 with record identifiers of records in record set B. Server 110 further may perform processing 140 by, at least in part, comparing hash summaries of records in record set A, as received in update request 130, with hash summaries of records of record set B. Server 110 may determine records to be added, records to be deleted, and records that have been modified in order to synchronize record set A in client 115 with record set B. As will be described herein in greater detail, server 110 may compare fields of records using the hash summaries to determine whether any of the fields of particular records have changed. If so, server 110 may send the changed fields instead of sending the entire record to client 115.

As an illustrative example, consider a case were a record set A includes 100 records constituting approximately 1 million bytes of information. If 98 records of record set A have changed, a conventional system would send the 98 changed records to the client. This would be the case whether the actual change in each of the 98 records was large or small. As such, the server would be sending nearly the entire 1 million bytes of data again to the client in response to the update request. In accordance with the inventive arrangements described herein, the server may send only the particular fields that have changed in each of the 98 records and not sent the fields of the 98 records that have not changed. Thus, if each if the 98 records has only one changed field that is 1 byte, those changed fields may be sent rather than the entirety of each of the 98 changed records.

FIG. 1 is provided for purposes of illustration and is not intended to limit the inventive arrangements described herein. It should be appreciated that network computing system 100 may include fewer elements than shown or more elements such as additional servers, clients, storage devices, or the like.

Figure 2:
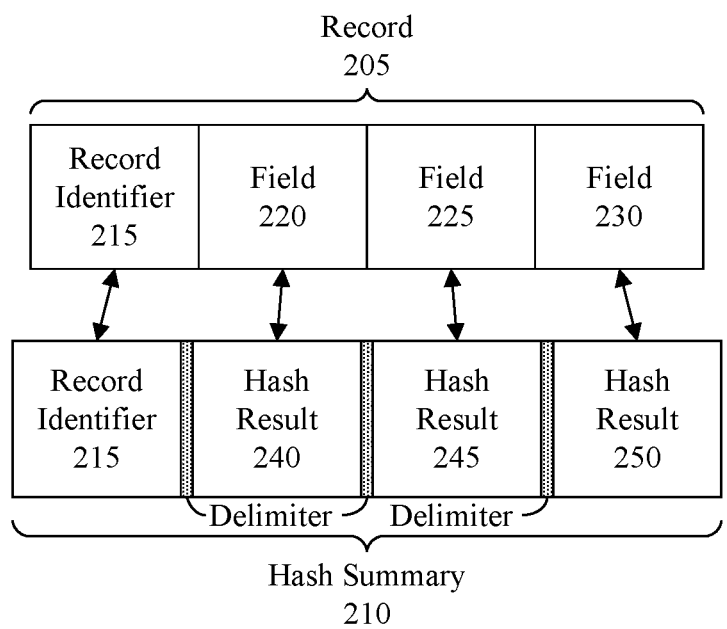
FIG. 2 is a block diagram illustrating an example of a record and a hash summary for the record.

FIG. 2 is a block diagram illustrating an example of a record and a hash summary for the record. In the example of FIG. 2, the server may receive data that is to be stored as a record. In response, the server may assign each record a unique identifier referred to as a "record identifier" herein. As pictured, record 205 has a record identifier 215. Record 205 further includes a plurality of fields 220, 225, and 230, e.g., properties. For example, record 205 may be a row within a table of a database or the like. As defined within this disclosure, a record is a data structure that includes a unique identifier and a plurality of fields in a predetermined order. Further, the particular data types of the various fields may be predetermined.

In one arrangement, for each record, the server may create a hash summary 210. The hash summary for a record may be stored in association with the record. In one aspect, the server may maintain a one-to-one relationship between records and hash summaries. Hash summary 210 is the hash summary for record 205. As pictured, hash summary 210 includes record identifier 215, e.g., the same unique value as used for record identifier 215 of record 205.

Hash summary 210 further includes a hash result for each field of record 205. The server may compute a hash for each field of the record. The hash results in the hash summary further are arranged in the same sequential order as the field from which each hash result is computed. For example, hash result 240 is the result the server applying a hash function to field 220. Hash result 245 is the result of the server applying a hash function to field 225. Hash result 250 is the result of the server applying a hash function to field 230. Hash results 240, 245, and 250 are ordered within hash summary 210 in the same sequence as the fields 220, 225, and 230, for which each hash result is calculated from record 205. The server may insert a delimiter between record identifier 215 and the first hash result (e.g., hash result 240 in this example) to indicate the boundary between record identifier 215 and the start of hash results of hash summary 210. The server further may insert delimiters between consecutive pair of hash results (e.g., between hash results 240 and 245 and between hash results 245 and 250) to indicate the boundary between consecutive hash results of hash summary 210.

In another arrangement, the server further may compress hash summaries for storage. Thus, the server may apply compression to hash summary 210 and store the compressed hash summary for subsequent use.

Figure 3:
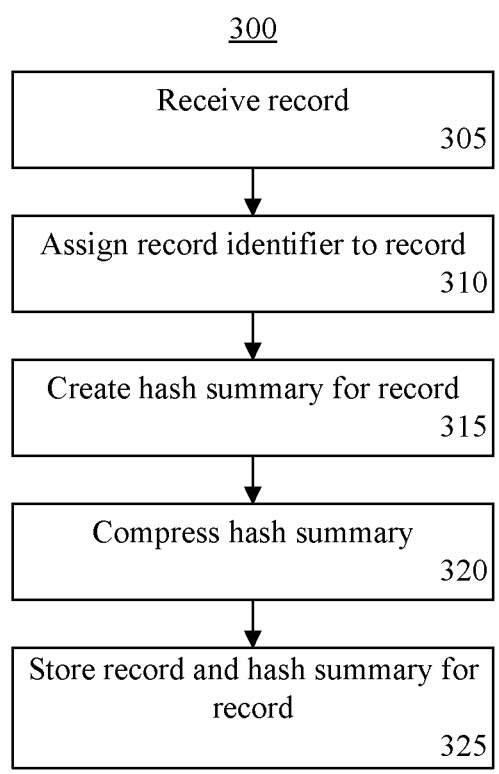
FIG. 3 is a flow chart illustrating an exemplary method of record synchronization in a network computing system.

FIG. 3 is a flow chart illustrating an exemplary method 300 of record synchronization in a network computing system. Method 300 may be performed using the network computing system described with reference to FIG. 1. In one arrangement, method 300 may be performed by the server (hereafter "the system") described with reference to FIG. 1. Method 300 illustrates exemplary operations that may be performed by the system responsive to each received record.

In block 305, the system may receive a record. In block 310, the system may assign a record identifier to the record. As discussed, each record identifier is unique and uniquely identifies the record received in block 305. In block 315, the system may create a hash summary for the record. In one aspect, the system may calculate a hash result for each field of the record. The system may then concatenate the record identifier and hash results for each field. The hash results may be separated by a known delimiter. Further, the system may order the hash results in the hash summary in the same order as the particular field of the record from which each hash result is calculated.

In block 320, the system may compress the hash summary. In block 325, the system may store the record and the hash summary, (e.g., in compressed form) for the record. The record and the hash summary for the record may be stored in association with one another. For example, in locating a particular record, the system may also locate and retrieve the hash summary for the record.

In cases where the system receives an update to a previously imported record, the system may update the record as stored in memory and further generate a new hash summary for the record. The system may compress the newly generated hash summary and store the compressed hash summary in memory in association with the updated record.

Figure 4:
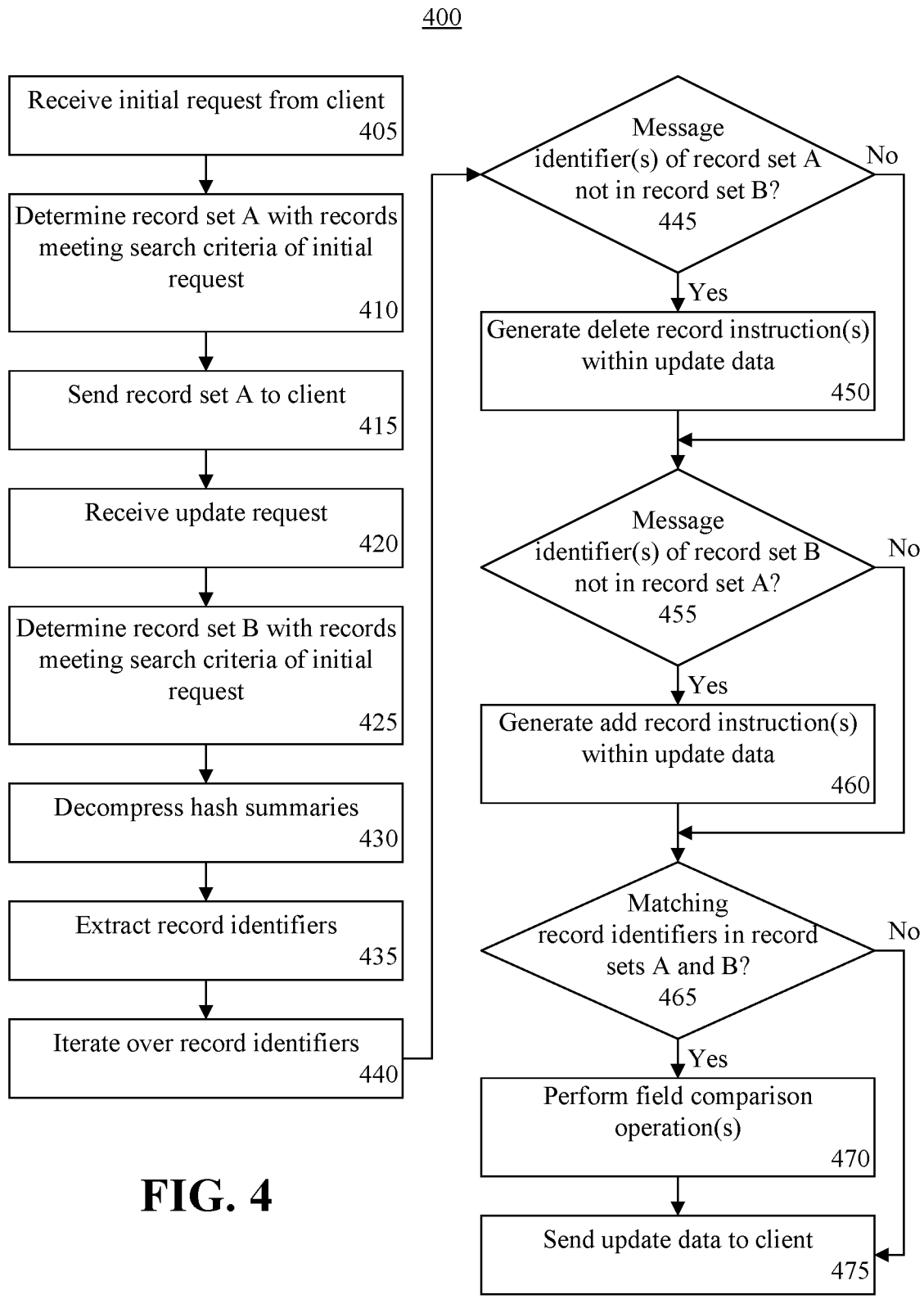
FIG. 4 is a flow chart illustrating another exemplary method of record synchronization in a network computing system.

FIG. 4 is a flow chart illustrating another exemplary method 400 of record synchronization in a network computing system. Method 400 may be performed using the network computing system described with reference to FIG. 1. In one arrangement, method 400 may be performed by the server (system) of FIG. 1. Method 400 may begin in a state after the system has stored a plurality of records as described with reference to FIG. 3.

In block 405, the system may receive an initial request from a client. The initial request may specify search criteria that may be used to locate one or more records of interest for the client. For example, the search criteria may indicate that records between two particular dates, e.g., May 1, 2015, and May 30, 2015, are wanted.

In block 410, the system may determine a record set, i.e., record set A, which includes each record that meets (or matches) the search criteria specified in the initial request received from the client. For example, the system may search a data storage device for records that match the search criteria of records dated from May 1, 2015, to May 30, 2015. The system further may determine, or fetch, the hash summary, e.g., the compressed hash summary, of each record in record set A.

In block 415, the system may send record set A to the client. In one aspect, record set A includes each record that meets the search criteria and the hash summary of each record in record set A. As noted, each hash summary that is sent as part of record set A may be compressed. As such, the client receives all properties of each record in record set A along with the hash summary of each record.

In another arrangement, the system may send the record set without the hash summaries. In that case, the client may calculate the hash summary for each record as described herein and store the records of record set A along with the associated hash summaries in a local memory within the client. The hash summaries may be compressed by the client as part of hash summary processing and/or generation, as described herein with reference to the server.

In block 420, the server may receive an update request from the client. For example, the client may poll the system for updates to record set A. Accordingly, the update request received by the system specifies the same search criteria from the initial request received in block 405. In addition, the update request may include each hash summary initially received as part of record set A. The update request may include each hash summary in compressed format as described.

In block 425, in response to the update request, the system determines a record set, i.e., record set B, having records that meet (or match) the search criteria specified in the update request. In one arrangement, the system searches the records within the data storage device and fetches the record identifier and hash summary of each record that meets the search criteria. For example, the system may again search a data storage device for records that match the search criteria of records dated from May 1, 2015, to May 30, 2015.

Between the initial request and the update request from the client, one or more records initially provided to the client as part of record set A may have been modified or deleted. Further, depending upon the search criteria specified in the initial request and the update request, new records may have been added after the initial request and prior to the update request that would now be returned as part of record set B. It should be appreciated that the update request may include an identifier designating the request as an update request as compared to the initial request. Further, the update request includes the hash summaries of record set A.

In block 430, the system may decompress the hash summaries. For example, the system may decompress the hash summaries received from the client as part of the update request. The system may further decompress the hash summaries of record set B. In block 435, the system may extract record identifiers from the decompressed hash summaries from the update request. Accordingly, the system has a list of record identifiers for each record initially sent to the client as part of record set A and a list of record identifiers for each record included in record set B. It should be appreciated that the record identifiers for record set B may be obtained directly from the data storage device of the system or may be extracted from the hash summaries of record set B post decompression. Further, it should be appreciated that record set B is considered an updated, or up-to-date, version of record set A that is to be synchronized to the client. In block 440, the system may iterate over the record identifiers of record sets A and B. The system may compare the list of record identifiers for record set A with the list of record identifiers for record set B.

In block 445, the system may determine if any record identifiers of record set A (e.g., the list of record identifiers of record set A) are not in record set B (the list of record identifiers of record set B). Any record identifiers of record set A not within record set B indicate that the records were deleted from the system after record set A was provided to the client. If so, method 400 may continue to block 450. If not method 400 may proceed to block 455. In block 450, the system may generate a delete record instruction for each record identifier in record set A not found in record set B. The system may add the delete record instruction(s) to update data that is to be sent to the client in response to the update request. A delete record instruction may be a delete indicator (e.g., a command or pneumonic) and the record identifier of the record to be deleted in the client. In another aspect, the delete record instruction may be a delete indicator and the hash summary of the record to be deleted in the client. The server may compress the hash summary within the delete record instruction.

In block 455, the system may determine if any record identifiers of record set B (e.g., the list of record identifiers of record set B) are not in record set A (the list of record identifiers of record set A). If so, method 400 may continue to block 460. If not method 400 may proceed to block 465. Any record identifiers of record set B not within record set A indicate that the records were newly added to the system after record set A was sent to the client. In block 455, the system may generate an add record instruction for each record identifier in record set B not found in record set A. The system may add the add record instruction(s) to the update data that is to be sent to the client in response to the update request. An add record instruction may include an add indicator (e.g., a command or pneumonic), the record to be added, and the hash summary of the record. The hash summary may be compressed by the server within the add record instruction. In another arrangement, the add record instruction may include an identifier and the record to be added without the hash summary for the record to be added. In that case, the client may calculate the hash summary and/or compress the hash summary as described herein.

In block 465, the system may determine if any record identifiers of record set B (e.g., the list of record identifiers of record set B) match record identifiers in record set A (the list of record identifiers of record set A). If so, method 400 may continue to block 470. If not method 400 may proceed to block 475. Any record identifiers of record set B determined to match record identifiers of record set A indicate that the records match and further evaluation of the records is necessary to determine whether any fields of the records have changed since the initial request. Accordingly, in block 470, the system may perform fields comparison operations for such matching record identifiers between record set A and record set B. For each record that the system determines has changed from the fields comparison operations, the system may generate a change record instruction within the update data.

A change record instruction may be a change indicator (e.g., a command or pneumonic), the hash summary of the updated record (i.e., the hash summary of the updated record from record set B), and the new or updated fields for the record that changed. The system may compress the hash summary within the change record instruction. It should be appreciated that the change record instruction does not include the entire record that changed, e.g., all fields of the changed record. The change record instructions only includes the particular fields of the record that have changed. Fields that have not changed are not included in the change record instruction and are not provided to the client.

In block 475, the system may send the update data to the client. The update data sent to the client may include zero, one, or more add record instructions; zero, one, or more delete record instructions; and/or zero, one or more change record instructions. It should be appreciated that while not described with reference to FIG. 4, any records that may be sent to the client, whether as part of record set A or in the update data as a newly added record may also be compressed if so desired.

Figure 5:
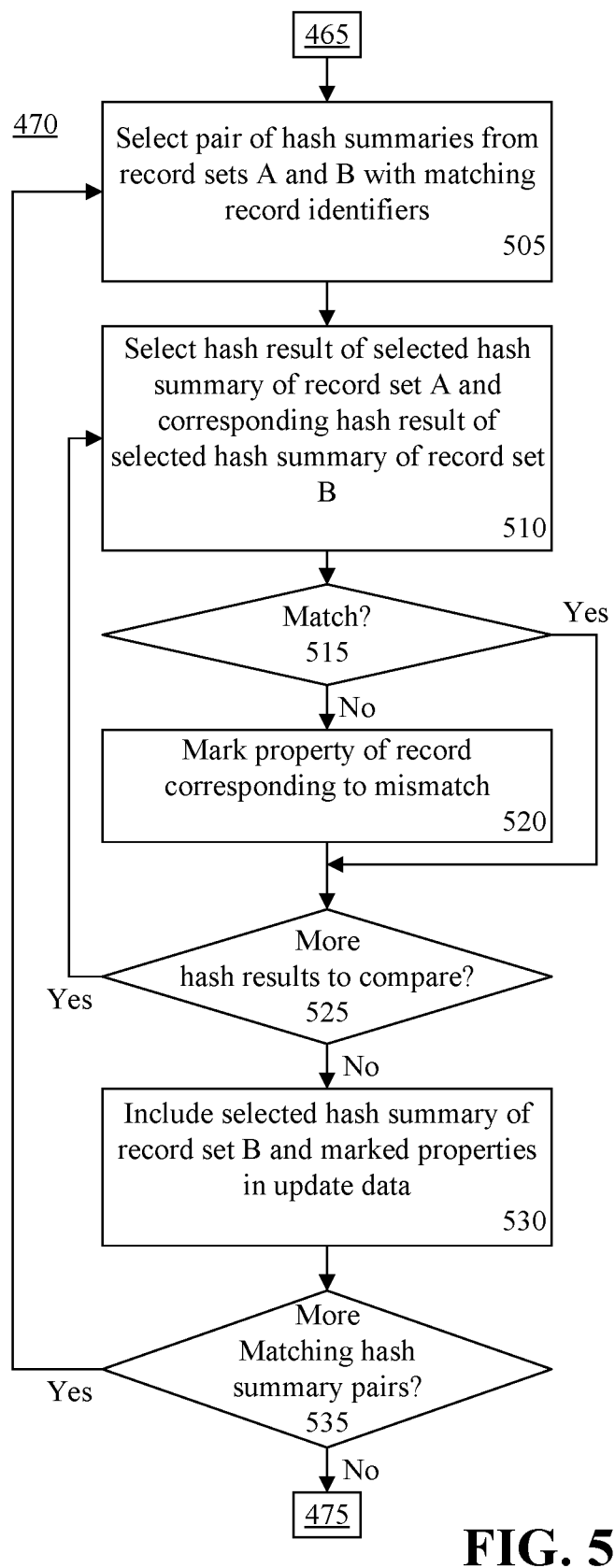
FIG. 5 is a flow chart illustrating an exemplary method of performing field comparison for records.

FIG. 5 is a flow chart illustrating an exemplary method of performing block 470 of FIG. 4. FIG. 5 illustrates exemplary field processing operations performed for matching records in record sets A and B as determined by comparing the record identifiers of records in the respective record sets. The method of FIG. 5 may proceed to block 505 from block 465 of FIG. 4.

In block 505, the system may select a pair of hash summaries from record sets A and B that have matching record identifiers (also referred to herein as a "hash summary pair"). In block 510, the system selects a hash result of the selected hash summary from record set A and the corresponding hash result of the selected hash summary of record set B. In this example, during the first iteration, the system may select the first hash result of the hash summary for record set A and the first hash result of the hash summary for record set B.

In block 515, the system determines whether the selected hash summaries match, e.g., are the same. If so, the system may continue to block 525. If not, the method may proceed to block 520. In block 520, the system may mark the field of the record within the system that has the same record identifier as the selected hash summaries that mismatch. In this example, in comparing the first hash results, the system marks the first field of the record in the system having the same record identifier as the hash summary pair. The mark indicates the mismatch and that the property of the record within the system has changed in comparison to the property of the record stored in the client.

In block 525, the system determines whether there are more hash results for the hash summary pair to be processed. If so, the method loops back to block 510 to select the next, e.g., the second, hash results of each hash summary of the hash summary pair. If not, the method may continue to block 530. In block 530, the system may generate a change record instruction for the record corresponding to the selected hash summary of record set B. For example, the system may add a change record instruction including the change record identifier, the selected hash summary for record set B of the hash summary pair, and the marked properties in the same order as would occur in the record.

In block 535, the system may determine whether there are any additional hash summary pairs to be processed. The system determines whether any further pairs of hash summaries that include a hash summary of record set A and a hash summary of record set B with matching record identifiers exist. If so, the method may loop back to block 505 to select the next hash summary pair. If not, the method may continue to block 475. The system constructs the update data, as illustrated in FIGS. 4 and 5, to reduce the amount of data returned to the client.

Referring again to FIG. 5, consider an example where the hash results of a hash summary of record set A after decompression are [4, 2, 3] and the hash results of a hash summary of record set B after decompression are [1, 2, 4]. In this example, the hash results being compared are from hash summaries that form a hash summary pair. In this example, because the fields and the hash results are ordered, the system determines that a mismatch exists in the first field, but not in the second and third fields. Accordingly, the system may generate a change record instruction sending the new first field to the client.

In accordance with the inventive arrangements described herein, when the client receives the update data, the client may iterate over the received update data to determine what records need to be deleted, added, or changed (e.g., updated) in the locally stored collection, e.g., record set A. The client may delete records from locally stored record set A having a record identifier determined from a delete record instruction. The client may extract the record identifier from the instruction whether specified directly therein or by first decompressing the hash summary of the delete record instruction and obtaining the record identifier from the decompressed hash summary. Record addition may be performed in similar fashion by adding and/or storing the record specified by the add record instruction and storing the hash summary for the record.

For record changes, the client may perform its own comparison of received hash summaries with those stored therein. For example, for a given change record instruction, the client may decompress the hash summary from the instruction, extract the record identifier, locate the hash summary from the locally stored record set A having the same record identifier, and compare the hash results of the hash summaries. The client may iterate over the hash results of the hash summary in record set A and the hash results of the summary hash from the change record instruction to determine which fields have changed. The client may update the appropriate, e.g., changed, fields of the record stored locally using the field values received in the change record instruction.

Figure 6:
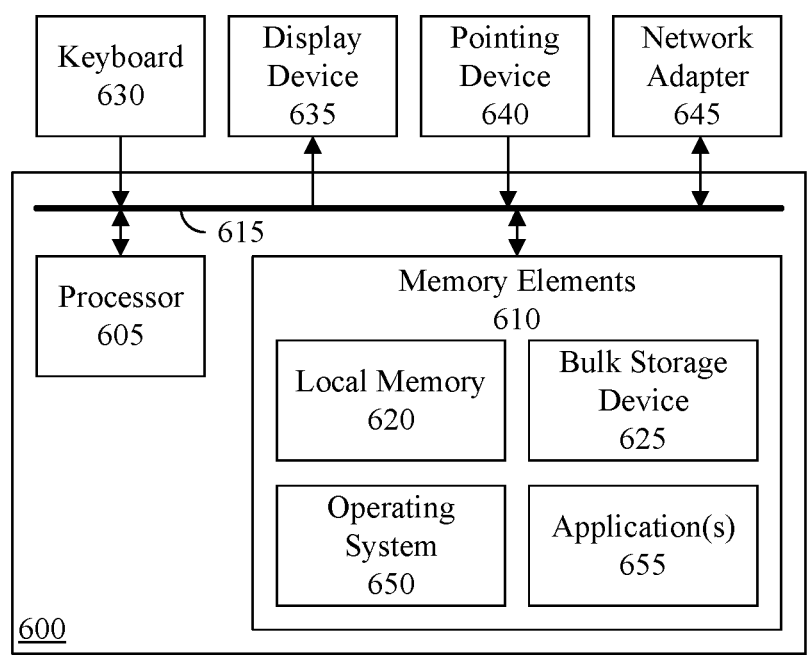
FIG. 6 is a block diagram illustrating example architecture for a data processing system.

FIG. 6 is a block diagram illustrating an exemplary architecture 600 for data processing system. In one example, architecture 600 may be used to implement the server as described with reference to FIG. 1. In another example, architecture 600 may be used to implement the client as described with reference to FIG. 1.

Architecture 600 includes at least one processor 605, e.g., a central processing unit (CPU), coupled to memory elements 610 through a system bus 615 or other suitable circuitry. Architecture 600 stores program code within memory elements 610. Processor 605 executes the program code accessed from memory elements 610 via system bus 615. In one aspect, architecture 600 may be used to implement a computer or other data processing system that is suitable for storing and/or executing program code. It should be appreciated, however, that architecture 600 may be used to implement any system including a processor and memory that is capable of performing the functions described within this disclosure.

Memory elements 610 include one or more physical memory devices such as, for example, a local memory 620 and one or more bulk storage devices 625. Local memory 620 may be implemented as a random access memory (RAM) or other non-persistent memory device(s) generally used during actual execution of the program code. Bulk storage device 625 may be implemented as a hard disk drive (HDD), solid state drive (SSD), or other persistent data storage device. Architecture 600 also may include one or more cache memories (not shown) that provide temporary storage of at least some program code in order to reduce the number of times program code must be retrieved from the bulk storage device during execution.

Input/output (I/O) devices such as a keyboard 630, a display device 635, and a pointing device 640 optionally may be coupled to architecture 600. The I/O devices may be coupled to architecture 600 either directly or through intervening I/O controllers. A network adapter 645 may also be coupled to architecture 600 to enable a system implemented using architecture 600 to become coupled to other systems, computer systems, remote printers, remote storage devices, and the like through intervening private or public networks. Modems, cable modems, Ethernet cards, and wireless transceivers are examples of different types of network adapter 645 that may be used with architecture 600.

Memory elements 610 store an operating system 650 and an application 655. Operating system and application 655, being implemented in the form of executable program code, are executed by architecture 600. As such, operating system 650 and/or application 655 may be considered an integrated part of any system implemented using architecture 600. Application 655 and any data items used, generated, and/or operated upon by architecture 600 while executing application 655 are functional data structures that impart functionality when employed as part of architecture 600.

In the case where architecture 600 is used to implement the server of FIG. 1, operating system 650 may be a server-side operating system; and, application 655 may be a server-side application that, when executed, causes the server to perform the various operations described herein. In the case where architecture 600 is used to implement the client of FIG. 1, operating system 650 may be a client-side operating system; and, application 655 may be a client-side application that, when executed, causes the client to perform the various operations described herein.

The inventive arrangements described within this disclosure facilitate field-in-record synchronization. As such, the inventive arrangements provide a correlation between the update mechanism and the real world application in accordance with the records and fields that are updated as opposed to relying on arbitrarily imposed data boundaries for blocks or chunks to be synchronized. Data may be synchronized and/or refreshed according to the record level and/or the field level. Further, the techniques described are state-less in that the client state information need not be maintained on the server.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the term "executable operation" or "operation" is a task performed by a data processing system or a processor within a data processing system unless the context indicates otherwise. Examples of executable operations include, but are not limited to, "processing," "computing," "calculating," "determining," "displaying," "comparing," or the like. In this regard, operations refer to actions and/or processes of the data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "plurality" means two or more than two.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the terms "program code," "software," "application," and "executable code" mean any expression, in any language, code or notation, of a set of instructions intended to cause a data processing system to perform a particular function either directly or after either or both of the following: a) conversion to another language, code, or notation; b) reproduction in a different material form. Examples of program code may include, but are not limited to, a subroutine, a function, a procedure, an object method, an object implementation, an executable application, an applet, a servlet, source code, object code, a shared library/dynamic load library and/or other sequence of instructions designed for execution on a computer system.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of data synchronization, comprising:
for each of a plurality of records:
    receiving the record;
    assign a record identifier to the record;
    creating a hash summary for the record, wherein the hash summary for the record comprises a record identifier of the record concatenated with a hash result of hashing each field of the record;
    compressing the hash summary for the record;
    storing the record and the hash summary for the record;
receiving, using a processor, an update request from a client system for a first record set to be updated, wherein the update request comprises search criteria used to initially determine the first record set and hash summaries of records of the first record set;
searching, using the processor, the data storage device for records matching the search criteria, wherein the searching generates a second record set of records having hash summaries;
comparing, using the processor, record identifiers of records of the second record set with record identifiers of the hash summaries of the first record set;
responsive to determining that a record identifier of a selected hash summary of the first record set matches a record identifier of a record of the second record set, determining, using the processor, whether hash fields of the selected hash summary of the first record set match hash fields of the hash summary of the record of the second record set; and
responsive to determining a mismatch between hash fields, sending, using the processor, a field of the record of the second record set indicated by the mismatched hash fields to the client system without sending fields of the record determined to match.

2. The method of claim 1, wherein the hash summaries are compressed, the method further comprising:
decompressing the hash summaries.

3. The method of claim 1, further comprising:
responsive to determining that the second record set comprises a record identifier not within the record identifiers of the first record set, sending an add record instruction to the client comprising a new record and a hash summary for the new record.

4. The method of claim 1, further comprising:
responsive to determining that the first record set comprises a record identifier not within the record identifiers of the second record set, sending a delete record instruction to the client specifying the record identifier not within the record identifiers of the second record set.

5. The method of claim 1, wherein a plurality of mismatched hash fields are determined, wherein sending the field of the record of the second record set represented by the mismatched hash field of the selected hash summary of the second record set to the client system comprises:
sending each of the plurality of fields of the record of the second record set represented by the mismatched hash fields of the selected hash summary of the second record set ordered according to the record data structure.

6. The method of claim 1, further comprising:
responsive to determining the mismatch between hash fields, generating a change record instruction including the field of the record of the second record set indicated by the mismatched hash fields;

wherein sending the field of the record of the second record set indicated by the mismatched hash fields to the client system comprises sending the change record instruction to the client system.

7. The method of claim 6, wherein the change record instruction is a change indicator command or a change indicator pneumonic.

8. A system, comprising:
at least one processor programmed to initiate executable operations comprising:
for each of a plurality of records:
receiving the record;
assign a record identifier to the record;
creating a hash summary for the record, wherein the hash summary for the record comprises a record identifier of the record concatenated with a hash result of hashing each field of the record;
compressing the hash summary for the record;
storing, to a data storage device, the record and the hash summary for the record;
receiving an update request from a client system for a first record set to be updated, wherein the update request comprises search criteria used to initially determine the first record set and hash summaries of records of the first record set;
searching the data storage device for records matching the search criteria, wherein the searching generates a second record set of records having hash summaries;
comparing record identifiers of records of the second record set with record identifiers of the hash summaries of the first record set;
responsive to determining that a record identifier of a selected hash summary of the first record set matches a record identifier of a record of the second record set, determining whether hash fields of the selected hash summary of the first record set match hash fields of the hash summary of the record of the second record set; and
responsive to determining a mismatch between hash fields, sending a field of the record of the second record set indicated by the mismatched hash fields to the client system without sending fields of the record determined to match.

9. The system of claim 8, wherein the hash summaries are compressed and the processor is further programmed to perform executable operations comprising:
decompressing the hash summaries.

10. The system of claim 8, wherein the processor is further programmed to perform executable operations comprising:
responsive to determining that the second record set comprises a record identifier not within the record identifiers of the first record set, sending an add record instruction to the client comprising a new record and a hash summary for the new record.

11. The system of claim 8, wherein the processor is further programmed to perform executable operations comprising:
responsive to determining that the first record set comprises a record identifier not within the record identifiers of the second record set, sending a delete record instruction to the client specifying the record identifier not within the record identifiers of the second record set.

12. The system of claim 8, wherein a plurality of mismatched hash fields are determined, wherein sending the field of the record of the second record set represented by the mismatched hash field of the selected hash summary of the second record set to the client system comprises:
sending each of the plurality of fields of the record of the second record set represented by the mismatched hash fields of the selected hash summary of the second record set ordered according to the record data structure.

13. The system of claim 8, wherein the processor is further programmed to perform executable operations comprising:
responsive to determining the mismatch between hash fields, generating a change record instruction including the field of the record of the second record set indicated by the mismatched hash fields;
wherein sending the field of the record of the second record set indicated by the mismatched hash fields to the client system comprises sending the change record instruction to the client system.

14. The system of claim 13, wherein the change record instruction is a change indicator command or a change indicator pneumonic.

15. A computer program product comprising a computer readable storage medium having program code stored thereon, the program code executable by at least one processor to perform a method comprising:
for each of a plurality of records:
receiving the record;
assign a record identifier to the record;
creating a hash summary for the record, wherein the hash summary for the record comprises a record identifier of the record concatenated with a hash result of hashing each field of the record;
compressing the hash summary for the record;
storing, to a data storage device, the record and the hash summary for the record;
receiving an update request from a client system for a first record set to be updated, wherein the update request comprises search criteria used to initially determine the first record set and hash summaries of records of the first record set;
searching the data storage device for records matching the search criteria, wherein the searching generates a second record set of records having hash summaries;
comparing record identifiers of records of the second record set with record identifiers of the hash summaries of the first record set;
responsive to determining that a record identifier of a selected hash summary of the first record set matches a record identifier of a record of the second record set, determining whether hash fields of the selected hash summary of the first record set match hash fields of the hash summary of the record of the second record set; and
responsive to determining a mismatch between hash fields, sending a field of the record of the second record set indicated by the mismatched hash fields to the client system without sending fields of the record determined to match.

16. The computer program product of claim 15, wherein the hash summaries are compressed, the method further comprising:
decompressing the hash summaries.

17. The computer program product of claim 15, the method further comprising:
responsive to determining that the second record set comprises a record identifier not within the record identifiers of the first record set, sending an add record instruction to the client comprising a new record and a hash summary for the new record.

18. The computer program product of claim 15, the method further comprising:
  responsive to determining that the first record set comprises a record identifier not within the record identifiers of the second record set, sending a delete record instruction to the client specifying the record identifier not within the record identifiers of the second record set.

19. The computer program product of claim 15, wherein a plurality of mismatched hash fields are determined, wherein sending the field of the record of the second record set represented by the mismatched hash field of the selected hash summary of the second record set to the client system comprises:
  sending each of the plurality of fields of the record of the second record set represented by the mismatched hash fields of the selected hash summary of the second record set ordered according to the record data structure.

20. The computer program product of claim 15, the method further comprising:
  responsive to determining the mismatch between hash fields, generating a change record instruction including the field of the record of the second record set indicated by the mismatched hash fields;
  wherein sending the field of the record of the second record set indicated by the mismatched hash fields to the client system comprises sending the change record instruction to the client system.

* * * * *